United States Patent
Park et al.

(10) Patent No.: US 8,510,033 B2
(45) Date of Patent: Aug. 13, 2013

(54) INDOOR NAVIGATION METHOD AND SYSTEM USING ILLUMINATION LAMPS

(75) Inventors: Sung-Bum Park, Suwon-si (KR);
Dae-Kwang Jung, Suwon-si (KR);
Hong-Seok Shin, Yongin-si (KR);
Jeong-Seok Choi, Yongin-si (KR);
Kyung-Woo Lee, Yongin-si (KR);
Ki-Uk Song, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 302 days.

(21) Appl. No.: 12/977,622

(22) Filed: Dec. 23, 2010

(65) Prior Publication Data
US 2011/0153201 A1    Jun. 23, 2011

(30) Foreign Application Priority Data

Dec. 23, 2009  (KR) .................. 10-2009-0130188

(51) Int. Cl.
*H04B 10/08*  (2006.01)
*G01C 21/00*  (2006.01)
(52) U.S. Cl.
USPC .............................. 701/409; 701/433; 398/43

(58) Field of Classification Search
USPC ......... 701/409, 428, 433, 434, 449; 340/531; 398/43, 17, 130; 315/294
See application file for complete search history.

(56) References Cited

U.S. PATENT DOCUMENTS

| | | | | |
|---|---|---|---|---|
| 7,969,297 | B2* | 6/2011 | Haartsen et al. | 340/531 |
| 2008/0095533 | A1* | 4/2008 | Lee | 398/38 |
| 2010/0322635 | A1* | 12/2010 | Klinghult | 398/132 |
| 2011/0313660 | A1* | 12/2011 | Won et al. | 701/209 |

\* cited by examiner

*Primary Examiner* — Tan Q Nguyen
(74) *Attorney, Agent, or Firm* — The Farrell Law Firm, P.C.

(57) ABSTRACT

A method and apparatus for performing a navigation service in a mobile terminal is provided. Map information and an IDentification (ID) of an information spot, which is connected to a map server, are received from the information spot. A current position is determined. The map information and the current position are displayed A destination input by a user is received. An optimal path from the current position to the destination is calculated and displayed by using the map information. When the mobile terminal receives an ID of a general spot from the general spot, a current position of the mobile terminal is re-determined. When the re-determined current position is on the optimal path, the optimal path is updated and the updated optimal path from the re-determined current position to the destination is displayed.

19 Claims, 5 Drawing Sheets

INDOOR NAVIGATION METHOD AND SYSTEM USING ILLUMINATION LAMPS

PRIORITY

This application claims priority under 35 U.S.C. §119(a) to an application entitled "Indoor Navigation Method and System Using Illumination Lamps" filed in the Korean Intellectual Property Office on Dec. 23, 2009 and assigned Serial No. 2009-130188, the contents of which are incorporated herein by reference.

BACKGROUND OF THE INVENTION

1. Field of the Invention

The present invention relates generally to a navigation service, and more particularly, to an indoor navigation method and system using lighting.

2. Description of the Related Art

As the luminous efficiency of Light Emitting Diodes (LEDs) has improved, their price has decreased. The LED has recently entered the special lighting market, which includes portable devices, displays, vehicles, traffic lights, and billboards, and the general lighting market, which includes fluorescent lamps and incandescent electric lamps. Further, the interest in Radio over Fiber (RoF) technology, which is complementary to Radio Frequency (RF) technology, is increasing due to the lack of RF band frequency, the possibility of interference between several wireless communication technologies, the increase of security demands in communication, and the introduction of an ultrahigh speed ubiquitous communication environment of 4G wireless technology.

Visible light communication for delivering information by using a visible ray is safe in use, uses a wide band, and can be freely used without any restriction. Visible light communication can also accurately detect a reception range of information since a light arriving place or a light progressing direction can be seen. Thus, visible light communication has advantages in that it is reliable in terms of security and can be driven at low power in terms of power consumption. Accordingly, visible light communication can be applied to hospitals and airplanes in which the use of RF is restricted, and can be used in providing additional information using an electronic display board.

Additionally, visible light communication can be more efficiently used in combination with a communication system using other wired/wireless communication media. A visible light communication system for providing information using lighting inside a building in combination with power line communication based on a power line or a Wireless Local Area Network (WLAN) is being researched.

Meanwhile, a mobile communication terminal, such as a cellular phone or a smart phone, portable by a user now includes various convenient functions, such as, a message transmission/reception function, a wireless Internet function, a schedule management function, and a navigation function.

The navigation function using Global Positioning System (GPS), provides a current position of a user and path information to a desired target position. In general, the navigation function is implemented to provide a current position of a vehicle and path information when the vehicle is moving. However, recently, development of a navigation system for pedestrians using a mobile communication terminal, such as a cellular phone, a smart phone, or a Personal Digital Assistant (PDA), is being developed for pedestrians visiting a destination in a complicated downtown area or a strange area. A navigation system aimed at pedestrians provides an optimal path for arriving at a predetermined destination to a pedestrian having the navigation system, and allows the pedestrian having the navigation system to monitor a current position.

However, in the case of a conventional navigation system using GPS, if a pedestrian moves into a building or underground, the pedestrian may not be able to receive a GPS signal, so the pedestrian is unable to use a navigation service.

Accordingly, implementation of a navigation system indoors by installing an Access Point (AP) and using an RF signal has been attempted. However, a measurement error is large, and a large number of APs is required. Since an error in position information measurement is over 10 meters, the navigation system is too inconvenient to use. Further, in the use of an RF signal, the RF signal has difficulty transmitting between walls.

SUMMARY OF THE INVENTION

The present invention has been made to address at least the above problems and/or disadvantages and to provide at least the advantages described below. Accordingly, an aspect of the present invention provides a method for performing a navigation service inside a building by using indoor illumination lamps.

Another aspect of the present invention provides a terminal for using an indoor navigation service and a method for using the indoor navigation service.

According to one aspect of the present invention, a method is provided for performing a navigation service in a mobile terminal. Map information and an IDentification (ID) of an information spot, which is connected to a map server, are received from the information spot and a current position of the mobile terminal is determined. The map information and the current position is displayed. A destination input by a user is received. An optimal path from the current position to the destination is calculated and displayed by using the map information. When the mobile terminal receives an ID of a general spot from the general spot, a current position of the mobile terminal is re-determined. When the re-determined current position is on the optimal path, an optimal path is updated and the updated optimal path from the re-determined current position to the destination is displayed.

When the re-determined current position is not on the optimal path, an optimal path from the re-determined current position to the destination may be re-calculated and displayed.

When the mobile terminal receives additional information of a corresponding position from the general spot, the additional information may be displayed on a screen.

According to another aspect of the present invention, a terminal is provided for performing a navigation service. The terminal includes a display unit for displaying display contents under a control of a controller, and a storage unit for storing data required to operate the terminal. The terminal also includes an input unit for receiving a user's input and delivering the user's input to the controller, and an optical communication unit, which is comprised of a light receiving device and which receives an optical signal from an LED spot. The terminal further includes the controller for controlling each component of the terminal, receiving map information and an ID of an information spot connected to a map server from the information spot, determining a current position of the terminal, displaying the map information and the current position, calculating and displaying an optimal path from the current position to a destination by using the map information when the destination is input by the user, re-determining a current position of the terminal when an ID of a general spot is received from the general spot, and updating an optimal path and displaying the updated optimal path from the re-determined current position to the destination when the re-determined current position is on the optimal path.

When the re-determined current position is not on the optimal path, the controller may re-calculate and display an optimal path from the re-determined current position to the destination.

When additional information of a corresponding position is received from the general spot, the controller may display the additional information on a screen.

According to a further aspect of the present invention, a navigation system is provided. The navigation system includes a map server for storing map information and additional information of an area for which a navigation service is provided. The navigation system also includes a plurality of LED spots, which are connected to the map server and output information delivered from the map server and their ID information as an optical signal. The navigation system further includes a mobile terminal for receiving the optical signal including the map information and the ID information from one or more of the plurality of LED spots, perceiving a current position of the mobile terminal, and calculating and displaying an optimal path from the current position to a destination.

BRIEF DESCRIPTION OF THE DRAWINGS

The above and other aspects, features and advantages of the present invention will become more apparent from the following detailed description when taken in conjunction with the accompanying drawing in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention performs a lamp function and simultaneously delivers ID information by using visible light communication through LED lamps used as illumination lamps (spots) indoors in order to provide a navigation service indoors, such as inside a huge building or underground shopping center. Since each LED lamp is fixed to a corresponding position and has ID information that is individual identification information, a mobile terminal can perceive its current position by receiving ID information from a specific LED lamp. A navigation system according to an embodiment of the present invention is described in detail with reference to the accompanying drawings.

Figure 1:
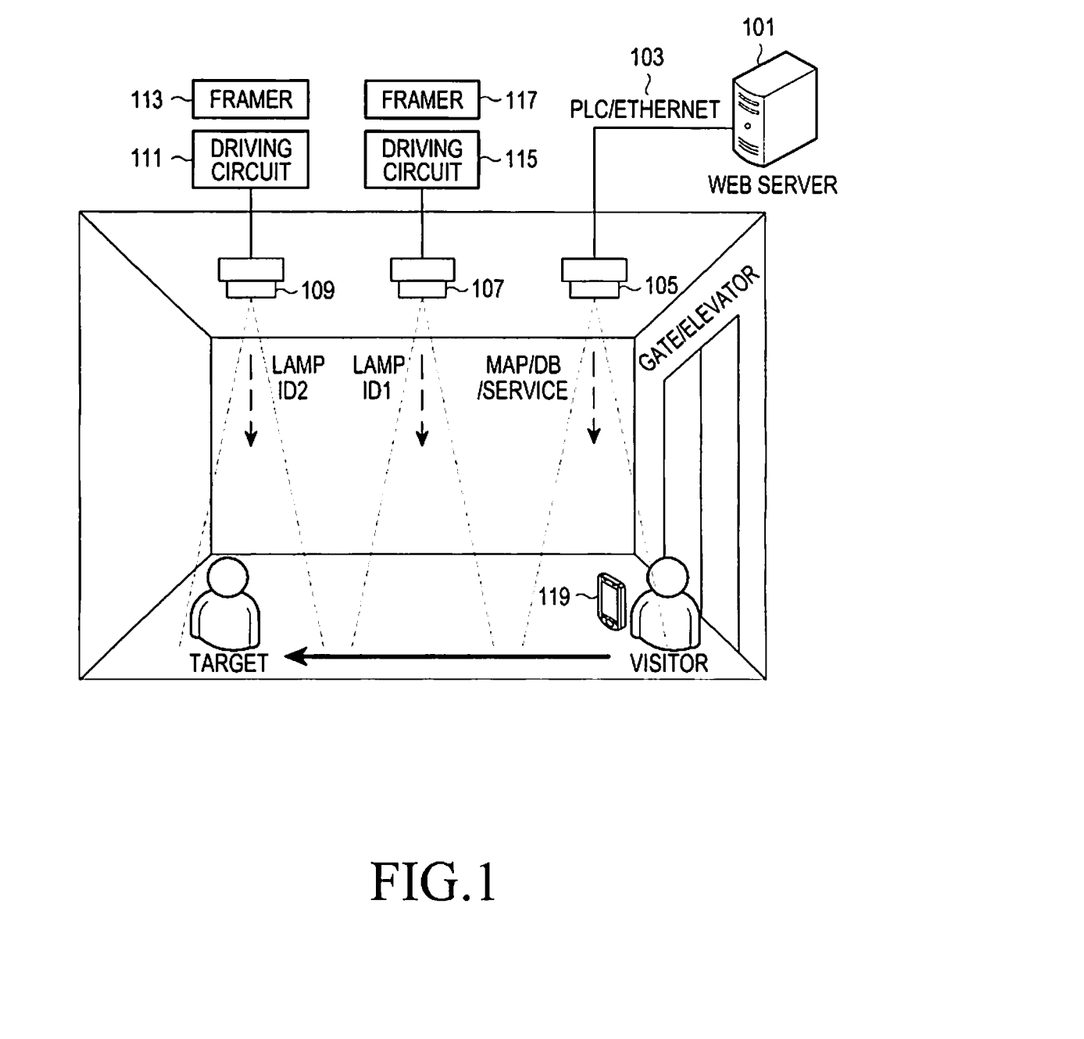
FIG. 1 is a block diagram illustrating an indoor navigation system, according to an embodiment of the present invention.

FIG. 1 is a block diagram illustrating an indoor navigation system, according to an embodiment of the present invention. The indoor navigation system includes a map web server 101 containing map information of the inside of a building for which a navigation service is provided. An information spot 105 is connected to the map server 101 via a Power Line Communication (PLC) network/Local Area Network (LAN) 103 and outputs map information, ID information of the information spot 105, and additional service information as a visible light signal. General spots 107 and 109 are indoor lamps that simultaneously generate their ID information as a visible light signal. A mobile terminal 119 receives the visible light signals from the spots 105, 107, and 109 and uses the navigation service.

The information spot 105 is installed at a gate of a building or an elevator entrance in each floor of the building, i.e., installed at a place in which a user can receive an optical signal containing map information and position information for the first time when the user enters into the building or the floor. In addition, the information spot 105 can also perform the role of a lamp and is connected to the map server 101 via a wired communication network, such as a PLC network or LAN.

When the user enters the building for the first time, the mobile terminal 119 receives the map information through the information spot 105 and displays the map information on a display unit. The user can set a destination in the displayed map information. The mobile terminal 119 calculates and displays an optimal path based on the received map information, a current position, and the destination. While the user is moving according to the optimal path, the mobile terminal 119 receives IDs of LED spots from the LED spots on the moving path, and accordingly, the user can continuously perceive a current position and check his/her moving path on the mobile terminal 119. If the user moves out of the optimal path, the mobile terminal 119 calculates an optimal path from a current position to the destination again, and accordingly, the user can receive a path guidance service to the destination.

The general spots 107 and 109 include an LED lamp, driving circuits 115 and 111, and framers 117 and 113 for constructing a visible light frame. The visible light frame constructed by the framers 117 and 113 includes ID information of the general spots 107 and 109, respectively. The general spots 107 and 109 may independently generate their own IDs in a light generation range without being connected via the wired communication network.

Figure 2:
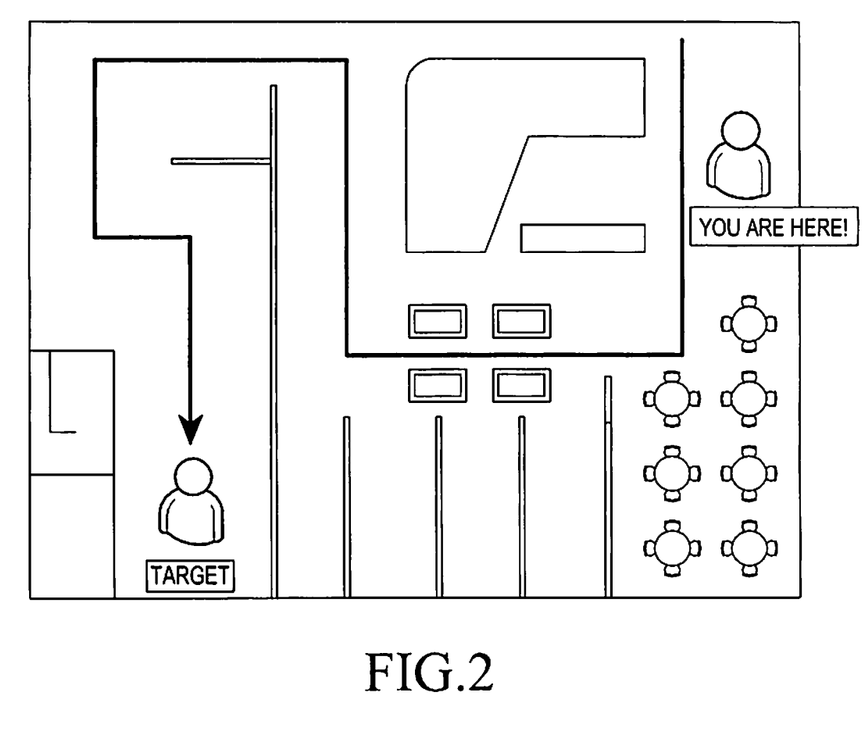
FIG. 2 is a display on a mobile terminal in the indoor navigation system, according to an embodiment of the present invention.

FIG. 2 is a display on a display unit of a mobile terminal when the mobile terminal uses a navigation service in the indoor navigation system, according to an embodiment of the present invention. As shown in FIG. 2, a user can check map information and optimal path information to a destination through a display unit and can also check information on a direction to go from a current position. A method of displaying the information on a screen or guiding the information with a voice may be used.

Figure 3:
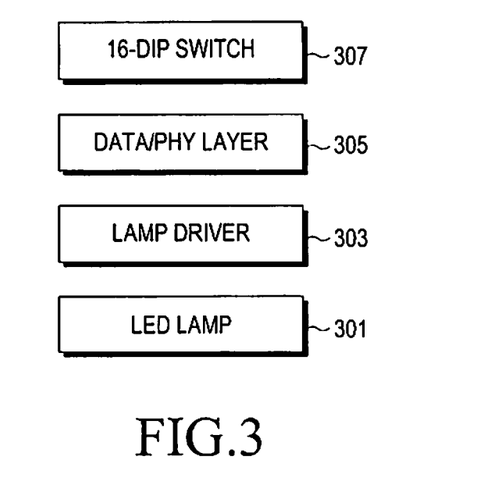
FIG. 3 is a hierarchical structure of an LED spot used in the indoor navigation system, according to an embodiment of the present invention.

FIG. 3 is a hierarchical structure of an LED spot used in the indoor navigation system, according to an embodiment of the present invention. Referring to FIG. 3, the LED spot includes an LED lamp 301 for generating light, a lamp driver 303 for driving the LED lamp 301, a data/PHY layer 305 for delivering an ID of the LED spot, and a 16-dip switch 307 for inputting the ID of the LED spot. In the case of an information spot, the information spot is connected to the map server 101 via a wired network.

LED spots must independently output their own IDs by themselves. When LED spots are installed in a building for the first time, a new ID is allocated to each of the LED spots in a design process, and the ID is not changed. The ID allocated to each of the LED spots can be input by using a dip switch or a digital switch. If the life of an LED ends, the LED itself is exchanged without changing the dip switch. Accordingly, general LED spots according to the present invention can always output their unique IDs even without being connected via a network. A person must directly approach a spot (illumination lamp) to change a dip switch, and if a digital switch using an RF control scheme is used instead of a dip switch, a person can change an ID of the digital switch by using an RF controller on the ground.

In addition, a spot (illumination lamp) according to the present invention forms a pattern and a symbol from light emitted from three LEDs when generating an optical signal. The reception terminal 119 can use a method for identifying 3 visible rays by identifying the pattern and the symbol through an optical sensor without using an optical filter. Even in the case of using a single LED, the reception terminal 119 can identify multiplexed information or be aware or command delivery through a shape of a visible ray emitted from the LED.

Figure 4:
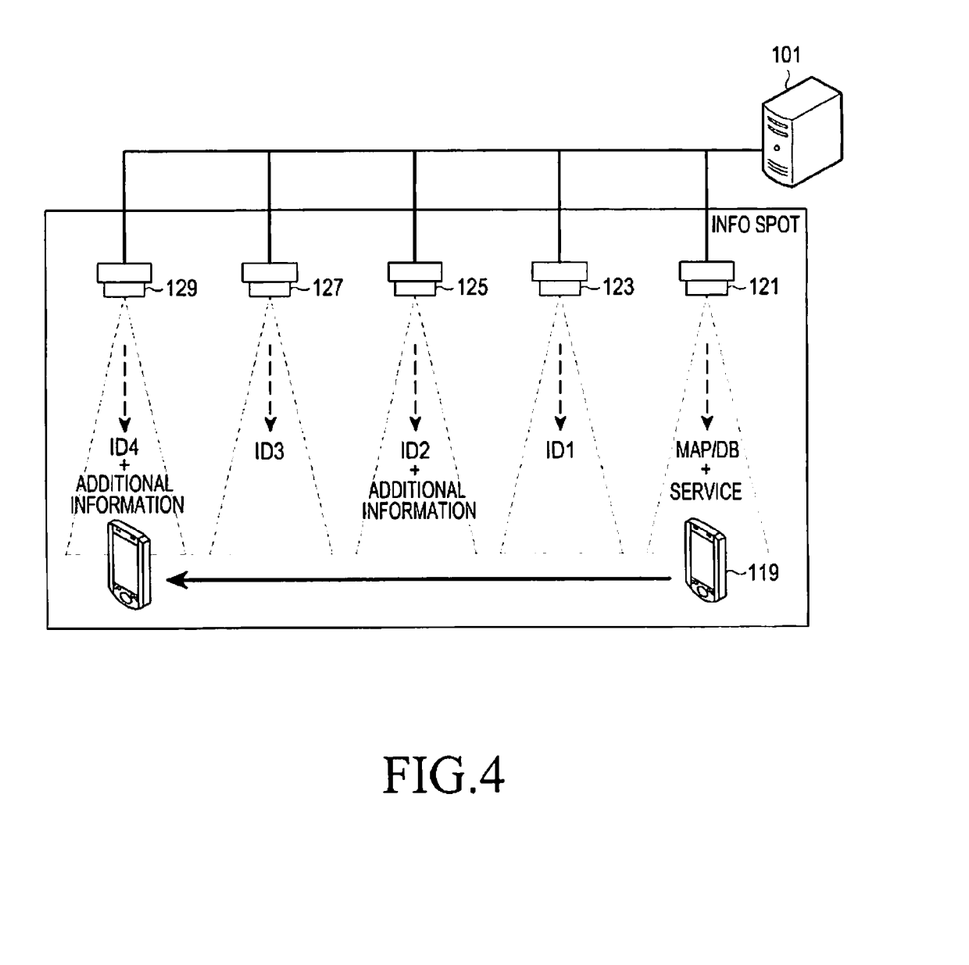
FIG. 4 is a diagram illustrating a configuration of spots connected via a wired network in the indoor navigation system, according to an embodiment of the present invention.

FIG. 4 illustrates a configuration of spots connected via a wired network in the indoor navigation system, according to an embodiment of the present invention. In FIG. 4, an information spot 121, as shown in FIG. 1, and general spots 123, 125, 127, and 129 are connected to the map server 101 via a wired network. All the spots 121, 123, 125, 127, and 129 can be connected via the wired network, and alternatively, some of the spots 121, 123, 125, 127, and 129 may be connected via the wired network.

If all spots are connected via a wired network, an individual ID input unit, such as a dip switch, is not necessary in the spots, and a map server (main server) can control and transmit IDs of the spots. Although there is difficulty in connecting all spots to each other in initial installation, each of the spots can transmit various kinds of information besides its ID information, thereby providing an information broadcasting service specialized for a corresponding position. For the wired network used for connecting the spots, a conventional Ethernet LAN cable or PLC scheme can be used, or a wired network specialized for an LED communication method can be used.

Figure 5:
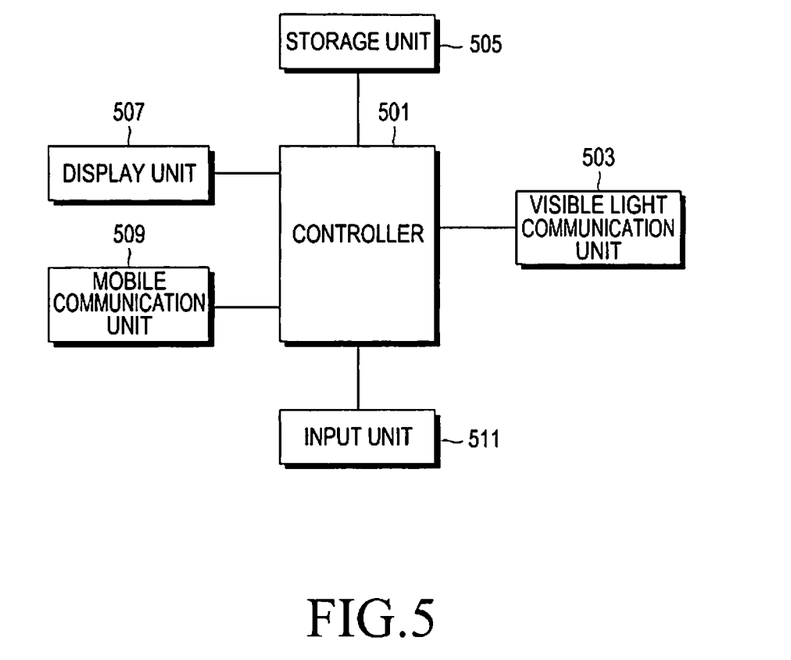
FIG. 5 is a block diagram illustrating the mobile terminal in the indoor navigation system, according to an embodiment of the present invention.

FIG. 5 is a block diagram illustrating the mobile terminal 119 in the indoor navigation system, according to an embodiment of the present invention.

Referring to FIG. 5, the mobile terminal 119 for using a navigation service in the indoor navigation system includes a controller 501, a storage unit 505, a display unit 507, a mobile communication unit 509, an input unit 511, and a visible light communication unit 503.

The controller 501 controls each component of the mobile terminal 119 and controls the general operation of the mobile terminal 119. In addition, according to an embodiment of the present invention, the controller 501 calculates an optimal path from a current position to a destination on a map through an algorithm of calculating a navigation optimal path. Further, according to an embodiment of the present invention, the controller 501 receives map information and an ID of an information spot connected to a map server via a wired network from the information spot and determines a current position. The controller 501 displays the map information and the current position. When a destination is input by the user, the controller 501 calculates and displays an optimal path from the current position to the destination by using the map information. When an ID is received from a general spot providing its ID information, the controller 501 re-determines a current position. The controller 501 determines whether the current position is the destination. When the current position is not the destination, the controller 501 determines whether the current position is on the optimal path. When the current position is on the optimal path, the controller 501 updates and displays an optimal path from the current position to the destination.

Under a control of the controller 501, the display unit 507 displays a map of an area for which the navigation service is provided. The display unit 507 displays a means, such as a search window, for searching for a destination where the user desires to go. When an optimal path to the destination set by the user is calculated, the display unit 507 displays the calculated optimal path on the map. In addition, when an ID is received from a spot while moving on the optimal path, the display unit 507 may display a position of the spot having the received ID on the map. When the mobile terminal 119 moves out of the optimal path, the display unit 507 may display 'out of path' with subtitles or a symbol.

The storage unit 505 stores data required to operate the mobile terminal 119. In addition, according to an embodiment of the present invention, the storage unit 505 stores map information received from an information spot, and stores additional information and ID information received from the information spot or a general spot. Further, the storage unit 505 stores an algorithm for calculating an optimal path from a current position to a destination in the navigation service.

The input unit 511 receives a user's input and delivers the user's input to the controller 501. When the display unit 507 is implemented with a touch screen, the display unit 507 may also operate as the input unit 511. The mobile terminal 119, according to an embodiment of the present invention, receives information regarding a destination where the user desires to go.

The visible light communication unit 503 receives an optical signal containing map information or ID information from a spot through a light receiving device, such as a photo diode. The visible light communication unit 503 may receive and transmit a visible light signal. The visible light communication unit 503 transmits a visible light signal through a light emitting device, such as an LED, by encoding data to be transmitted in visible light signal transmission according to a visible light communication protocol, and decodes a visible light signal received through a light receiving device in visible light signal reception.

The mobile communication unit 509 performs general wireless communication by transmitting and receiving an RF signal to and from an Access Point (AP) through an antenna.

Figure 6:
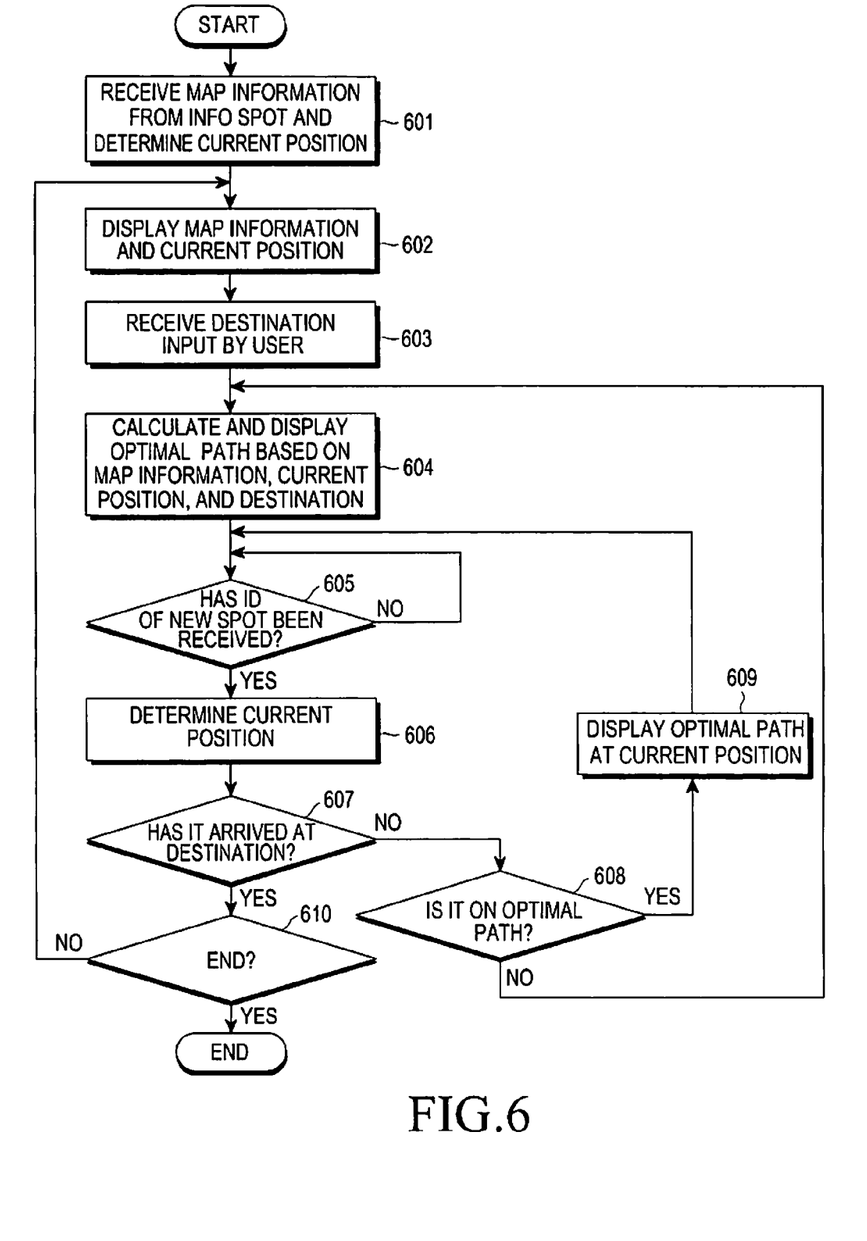
FIG. 6 is a flowchart illustrating an operation of the mobile terminal using a navigation service in the indoor navigation system, according to an embodiment of the present invention.

FIG. 6 is a flowchart illustrating an operation of the mobile terminal 119 using a navigation service in the indoor navigation system, according to an embodiment of the present invention.

Referring to FIG. 6, in step 601, when the mobile terminal 119 arrives at a building or a specific floor, the mobile terminal 119 determines a current position by receiving map information of an area for which the navigation service is provided from an information spot installed at a corresponding position and by receiving ID information of the information spot.

In step 602, the mobile terminal 119 displays the received map information and the current position of the mobile terminal 119 through the display unit 507. The displayed map can be enlarged or diminished based on the current position, and the mobile terminal 119 may further display a search window for allowing the user to easily search for a specific position on the map.

In step 603, the user selects a position where the user desires to go through the search window or a method of clicking the position on the map. Thereby, the mobile terminal 119 receives destination information selected by the user.

In step 604, when the destination information is input, the controller 501 of the mobile terminal 119 calculates an optimal path from the current position to the destination based on the received map information, the current position, and the destination, and displays a result of the calculation through the display unit 507. A time taken to move according to the optimal path can also be calculated and displayed. In addition, the controller 501 may informs the user of a direction to move based on the current position with a voice or subtitles so that the user can easily move to the destination.

In step 605, the mobile terminal 119 determines whether an ID of a new spot has been received. When an ID of a new spot has not been received, the mobile terminal 119 awaits reception. When an ID of a new spot has not been received, the mobile terminal 119 proceeds to step 606 to determine a current position of the mobile terminal 119 based on the received ID of the new spot. The new spot may be a general spot, which is not connected to a server, or a spot connected to the server. In the case of a spot connected to the server, the spot can output other additional information aside from the ID information.

In step 607, the mobile terminal 119 determines whether the mobile terminal 119 has arrived at the destination. If it is determined in step 607 that the mobile terminal 119 has not arrived at the destination, the mobile terminal 119 proceeds to step 608 to determine whether a current position is on the optimal path calculated in step 604. If it is determined in step 608 that a current position is on the optimal path, the mobile terminal 119 determines that the mobile terminal 119 is correctly moving according to the optimal path and proceeds to step 609 to display an optimal path at an updated current position. Specifically, the mobile terminal 119 displays movement of the mobile terminal 119 through the display unit 507. Thereafter, the mobile terminal 119 returns to step 605 to determine whether an ID of a new spot has been received.

If it is determined in step 608 that a current position is not on the optimal path, the mobile terminal 119 determines that the mobile terminal 119 moves out of the optimal path and proceeds to step 604 to re-calculate an optimal path and display the re-calculated optimal path through the display unit 507. The mobile terminal 119 may inform the user of 'out of path' with a voice, subtitles, or an alarm sound.

If it is determined in step 607 that the mobile terminal 119 has arrived at the destination, the mobile terminal 119 proceeds to step 610 to determine whether this operation ends. When it is determined that this operation does not end, the mobile terminal 119 returns to step 602 to continuously perform the navigation operation. Otherwise the mobile terminal 119 ends the navigation operation.

The present invention can provide a navigation function by using visible light communication through LED lighting indoors. Accordingly, a navigation function for easily finding a destination indoors, such as inside a building or an underground shopping center, can be provided.

As described above, an operation and configuration of an indoor navigation method and system using illumination lamps according to an embodiment of the present invention can be achieved. While the invention has been shown and described with reference to a certain embodiments thereof, it will be understood by those skilled in the art that various changes in form and detail may be made therein without departing from the spirit and scope of the invention as defined by the appended claims.

What is claimed is:

1. A method for performing a navigation service in a mobile terminal, the method comprising the steps of:
   receiving map information and an IDentification (ID) of an information spot from the information spot, which is connected to a map server, and determining a current position of the mobile terminal;
   displaying the map information and the current position;
   receiving a destination input by a user;
   calculating and displaying an optimal path from the current position to the destination by using the map information;
   when the mobile terminal receives an ID of a general spot from the general spot, re-determining a current position of the mobile terminal; and
   when the re-determined current position is on the optimal path, updating the optimal path and displaying the updated optimal path from the re-determined current position to the destination.

2. The method of claim 1, further comprising, when the re-determined current position is not on the optimal path, re-calculating an optimal path of the terminal and displaying the re-calculated optimal path from the re-determined current position to the destination.

3. The method of claim 1, wherein the information spot and the general spot form a pattern and a symbol from light emitted from a plurality of Light Emitting Diodes (LEDs), and
   the mobile terminal identifies a plurality of visible rays by identifying the pattern and the symbol through an optical sensor.

4. The method of claim 1, wherein the map server comprises map information of an area for which the navigation service is provided.

5. The method of claim 1, wherein the map server is connected to the information spot via a Power Line Communication (PLC) network or a Local Area Network (LAN).

6. The method of claim 1, wherein the information spot comprises an LED lamp for generating light, a lamp driver for driving the LED lamp, a data/physical layer for delivering the ID of the information spot, the map information, and additional service information to the lamp driver, and a switch for inputting the ID of the information spot.

7. The method of claim 1, wherein the general spot comprises an LED lamp for generating light, a lamp driver for driving the LED lamp, a data/physical layer for delivering the ID of the general spot to the lamp driver, and a switch for inputting the ID of the general spot.

8. The method of claim 1, wherein the general spot is connected to the map server via a communication network.

9. The method of claim 8, further comprising, when the mobile terminal receives additional information of a corresponding position from the general spot, displaying the additional information on a screen.

10. A terminal for performing a navigation service, the terminal comprising:
    a display unit for displaying display contents under a control of a controller;
    a storage unit for storing data required to operate the terminal;
    an input unit for receiving a user's input and delivering the user's input to the controller;
    an optical communication unit, which is comprised of a light receiving device and receives an optical signal from a Light Emitting Diode (LED) spot; and the controller for controlling each component of the terminal, receiving map information and an IDentification (ID) of an information spot from the information spot connected to a map server, determining a current position of the terminal, displaying the map information and the current position, calculating and displaying an optimal path from the current position to a destination by using the map information when the destination is input by the user, re-determining a current position of the terminal when an ID of a general spot is received from a general spot, and updating the optimal path and displaying the updated optimal path from the re-determined current position to the destination.

11. The terminal of claim 10, wherein, when the re-determined current position is not on the optimal path, the controller re-calculates an optimal path of the terminal and displays the re-calculated optimal path from the re-determined current position to the destination.

12. The terminal of claim 10, wherein the information spot and the general spot form a pattern and a symbol from light emitted from a plurality of LEDs, and
the terminal identifies a plurality of visible rays by identifying the pattern and the symbol through an optical sensor.

13. The terminal of claim 10, wherein the map server comprises map information of an area for which the navigation service is provided.

14. The terminal of claim 10, wherein the map server is connected to the information spot via a Power Line Communication (PLC) network or a Local Area Network (LAN).

15. The terminal of claim 10, wherein the information spot comprises an LED lamp for generating light, a lamp driver for driving the LED lamp, a data/physical layer for delivering the ID of the information spot, the map information, and additional service information to the lamp driver, and a switch for inputting the ID of the information spot.

16. The terminal of claim 10, wherein the general spot comprises an LED lamp for generating light, a lamp driver for driving the LED lamp, a data/physical layer for delivering the ID of the general spot to the lamp driver, and a switch for inputting the ID of the general spot.

17. The terminal of claim 10, wherein the general spot is connected to the map server via a communication network.

18. The terminal of claim 17, wherein, when the mobile terminal receives additional information of a corresponding position from the general spot, the controller displays the additional information on a screen.

19. A navigation system comprising:
a map server for storing map information and additional information of an area for which a navigation service is provided;
a plurality of LED spots, which are connected to the map server and output information delivered from the map server and their IDentification (ID) information as an optical signal; and
a mobile terminal for receiving the optical signal including the map information and the ID information from one or more of the plurality of LED spots, perceiving a current position of the mobile terminal, and calculating and displaying an optimal path from the current position to a destination.

* * * * *